(12) United States Patent  
Rowe et al.

(10) Patent No.: US 7,780,035 B2  
(45) Date of Patent: Aug. 24, 2010

(54) LIQUID CONTAINER WITH HINGEDLY ATTACHED FUNNELED DISH

(75) Inventors: Sean Rowe, Reno, NV (US); Mary V. Burns, Union, KY (US)

(73) Assignee: Veterinary Ventures, Inc., Reno, NV (US)

( * ) Notice: Subject to any disclaimer, the term of this patent is extended or adjusted under 35 U.S.C. 154(b) by 1068 days.

(21) Appl. No.: 11/356,277

(22) Filed: Feb. 15, 2006

(65) Prior Publication Data

US 2006/0201055 A1 Sep. 14, 2006

Related U.S. Application Data

(60) Provisional application No. 60/653,595, filed on Feb. 15, 2005.

(51) Int. Cl.
*B65D 21/02* (2006.01)
(52) U.S. Cl. .................. 220/703; 220/23.83; 220/23.86; 215/392
(58) Field of Classification Search .............. 220/23.86, 220/23.83, 23.2, 703, 6, 666, 23.4, 524, 826; 119/74, 51.5, 61.5, 61.54, 61.56, 72; 206/217, 206/538; 215/392, 386, 387, 900, DIG. 7, 215/6, 10
See application file for complete search history.

(56) References Cited

U.S. PATENT DOCUMENTS

| 517,108 A | * | 3/1894 | Lara | 206/547 |
| 3,223,127 A | * | 12/1965 | Sidebottom | 141/364 |
| 6,079,361 A | * | 6/2000 | Bowell et al. | 119/72 |

OTHER PUBLICATIONS

"Collapsible Food Dish" 2p., downloaded from http://www.jbpet.com/Shopping/product.asp?catalog_name=JBWholesale&product_id=571-1202&category_name=HTOTravelBowls on Feb. 23, 2007.
"Deluxe Pet Travel Bowl Dogs Cats Portable Water Dish" 7p. downloaded from http://cgi.ebay.com/Deluxe-Pet-Travel-Bowl-Dogs-Cats-Portable-Water-Dish_W0QQitemZ280019929409QQcmdZViewItem on Feb. 23, 2007.
"Handi-Drink" 2p., downloaded from http://www.jbpet.com/Shopping/product.asp?catalog_name=JBWholesale&product_id=703-0101&category_name=HTOTravelBowls on Feb. 9, 2006.

(Continued)

*Primary Examiner*—Stephen J. Castellano
(74) *Attorney, Agent, or Firm*—Holland & Hart LLP (57) ABSTRACT

The present disclosure provides various embodiments of a container and dish. In certain embodiments, the container and dish includes a container portion having a plurality of sides defining a cavity in the container portion. A mouth on one of the plurality of sides is in communication with the cavity in the container portion. In particular implementations, the container and dish includes a funnel on at least one of the plurality of sides of the dish portion. In further implementations, the dish portion and the container portion are movable from a nested, storage configuration to an open configuration for dispensing and/or refilling where the container portion and the dish portion are at least substantially co-planar. In yet further implementations, the dish portion is movable with respect to the container portion and may be nested within a depression formed in the container portion.

15 Claims, 9 Drawing Sheets

OTHER PUBLICATIONS

"Handi-Drik Portable Pet Water Bottle" 4p., downloaded from http://www.i-pets.com/handi-drink.html on Feb. 9, 2006.

"Kyjen Doggie Outing Bag & Lunch Box by Outward Hound" 2p., downloaded from http://www.pawstogo.com/index.asp?PageAction=VIEWPROD&ProdID=224 on Feb. 23, 2007.

"Oasis Pet Travel Canteen" 2p., downloaded from http://www.jbpet.com/Shopping/product.asp?catalog_name=JBWholesale&product_id=523-1000&category_name=HTOTravelBowls on Feb. 23, 2007.

"Pet Zone Walk-N-Water Canteen" 2p., downloaded from http://www.pawstogo.com/index.asp?PageAction=VIEWPROD&ProdID=52 on Feb. 9, 2006.

* cited by examiner

LIQUID CONTAINER WITH HINGEDLY ATTACHED FUNNELED DISH

RELATED APPLICATION INFORMATION

The present application claims the benefit of U.S. Provisional Patent Application No. 60/653,595, filed Feb. 15, 2005, the disclosure of which is hereby incorporated by reference.

TECHNICAL FIELD

The present application relates generally to liquid containers and, more specifically to liquid containers that may be used to hold and dispense water, for example, for hydrating animals.

BACKGROUND

Animals, particularly companion animals such as dogs, cats, and the like, are an important part of the lives of many people. These animals often accompany people while traveling and during various activities such as hiking and boating. It is important to ensure that the animals are provided with an adequate supply of potable water during these periods.

Typically, the water container in which the water is transported is not the same container from which the animal will consume the water. This can be inconvenient for the animal's owner for a number of reasons. For example, the owner must carry around multiple items. Also, it may be difficult to return unused water from the drinking container to the carrying container. In some cases, debris and/or other contaminants are introduced into the carrying container. At worst, the owner will throw away unused water, which can be frustrating in that the drinking water tends to be heavy to transport.

In addition, many typical water containers used for animal hydration are inconvenient to transport. Combined with the need for multiple containers, the owner may have to place the items in a separate carrying device, such as a sack or backpack.

It may also be beneficial to provide food for animals during periods of travel or recreation. However, this may require the animal's owner to carry a food dish in addition to the water dish and water container.

BRIEF SUMMARY

Certain embodiments provide a container and dish. In one aspect, the container and dish has a container portion and a dish portion that is received by the container portion when the container and dish is in a storage configuration. The container portion is preferably hollow and may be filled with a quantity of liquid.

In one implementation, the dish portion is rotatably connected to the container portion. For example, the dish portion may be connected to the container portion by a hinge, such as by a forked mount on the dish portion having pins which are received by depressions on the container portion. In another example, the dish portion has multiple mounting arms, each arm ending in two clamp members which define a generally circular opening that is configured to receive a pin extending from the container. The generally circular opening may be in communication with a slot extending into the clamp members. The slot may provide flexibility to the clamp members, allowing the clamp members to be more easily removed from, and reattached to, the pins.

When in a dispensing configuration, liquid may be poured from the container portion to the dish portion. In a particular implementation, unused liquid may be returned to the container portion from the dish portion prior to returning the container and dish to a storage configuration. In a particular example, a screen or grate is disposed in or proximate an opening to the container portion to prevent debris or contaminants from entering the container portion from the dish portion.

In at least one aspect, the container has a mouth covered by a cap from which liquid may be dispensed. In one implementation, the cap is attached to the mouth by a pressure fit or by mating threads on the cap and mouth. In another implementation, the cap has an aperture formed therein and a tab extends from the cap and may selectively cover the aperture.

In a yet another implementation, a movable lid is attached to the cap. Liquid may be selectively allowed to flow from, or into, the cap by moving the lid between various positions. In one example, the lid has apertures that can be selectively aligned with apertures formed in the cap. In a further example, the lid and/or cap contain varying number or sizes of apertures so that the flow of liquid from the cap may be selectively controlled.

In some embodiments, the dish portion includes a funnel structure to help transfer liquid from the dish portion to the container portion. The funnel structure may allow liquid to be transferred more quickly and/or with less spillage. In a particular implementation, the funnel structure is a lip formed on at least part of the dish portion. The lip may be coupled to the dish portion or an integral part thereof. In a particular example, the lip convexly extends from the bottom of the dish portion and towards the interior of the dish portion. The lip may be tapered, being wider as the lip reaches an end of the dish portion (proximate the mouth of the container portion).

In some embodiments, a well structure, such as a semi-circular well structure, is formed on the end of the dish portion that will be proximate the container portion when the container and dish is in a dispensing or refilling configuration. The well structure is configured to receive the mouth of the container portion. The well structure may include an inner wall forming an opening through which liquid may pass. A shelf, such as a semi-cylindrical shelf, may extend outwardly from the inner wall, and be configured to abut the mouth of the container portion in a dispensing or refilling configuration. The intersection of the shelf and the inner wall define notches on the lip of the dish portion that help matingly receive the mouth of the container portion so that spillage is reduced while transferring liquid from the dish portion to the container portion.

In another aspect, the dish portion of the container and dish may be selectively secured to the container portion, such as by a clip or clasp mechanism, in a storage configuration. In a particular implementation, the dish portion has a curved flange extending from one of its sides. The container portion has an angled tab extending from one of its sides. In a closed, storage configuration, the dish portion may be secured to the container portion by placing the flange over the tab. The flange can be released from the tab when the container and dish is to be placed in a dispensing configuration.

In another aspect, the container and dish has a carrying strap. In a particular implementation, the container portion has mounting tabs through which a carrying strap may be threaded.

In another aspect, the container and dish may be used for dispensing and/or serving other materials. For example, when in a dispensing configuration, material such as pet food may be placed in a portion of the container portion which receives the dish portion when the container and dish is in a storage configuration. In another example, the dish portion may be completely removed from the container portion so that both the dish portion and the portion of the container portion which receives the dish portion when the container and dish is in a storage configuration can be simultaneously used to serve material, such as food and water.

In some implementations, the container and dish is designed to allow at least a portion of the device to be placed on the ground so that the device can be used by an animal without being held by the owner. For example, in some implementations, in a dispensing configuration, the dish portion and container portion align or substantially align in plane. The container and dish may thus lie flat on the ground when liquid is provided in the dish portion. In further examples, at least one of the container portion and the dish portion have at least a substantially planar bottom, allowing it to rest at least substantially flat on a flat surface. When only one of the container portion and the dish portion has at least a substantially flat bottom, the other portion may have a support device, such as legs or a wedge, to aid in stabilizing the device. In yet further examples, the container portion and the dish portion are connected in a manner that allows the device to be placed on the ground, such as in an inverted "V" shape, such as being connected by a lockable hinge.

In some implementations, the dish portion nests within a concave part of the container portion in a storage configuration. The dish portion "nests within" the container portion in that at least part of the dish portion fits within the overall form factor of the container portion in the storage configuration. For example, in a storage configuration, the lip of the dish portion abuts the edge of the concave part of the container portion, with the body of the dish portion in the concave part. In such implementations, unlike implementations in which a container portion nests within a concave part of a dish portion, a funnel structure or other part of a hinged dish portion does not impede nesting of the different portions. Moreover, in such implementations, the relatively wider container portion enhances stability of the container and dish as water is provided to an animal.

The present disclosure also presents methods of using the disclosed containers and dishes. Certain methods allow liquid to be transferred from a dish portion to a container portion, such as using a funnel. According to further disclosed methods, a container and dish may be moved from a dispensing configuration, such as where the container portion and dispensing portion are at least substantially co-planar, to a storage configuration where the dish portion at least in part nests within the container portion.

There are additional features and advantages of the various embodiments of the present invention. They will become evident as this specification proceeds.

In this regard, it is to be understood that this is a brief summary of the various embodiments described herein. Any given embodiment of the present invention need not provide all features noted above, nor must it solve all problems or address all issues in the prior art noted above.

BRIEF DESCRIPTION OF THE DRAWINGS

Various embodiments are shown and described in connection with the following drawings in which.

DETAILED DESCRIPTION

A detailed description of various modes of practicing the present invention is presented. However, it is to be understood the disclosed embodiments are merely examples of the ways the invention may be accomplished in various forms. Specific structural and functional details described here are not to be interpreted as limiting, but only as a representative basis for teaching one skilled in the art to variously employ the various aspects of the present invention in any appropriate structure.

Water Supply/Canteen Structures

Figure 1:
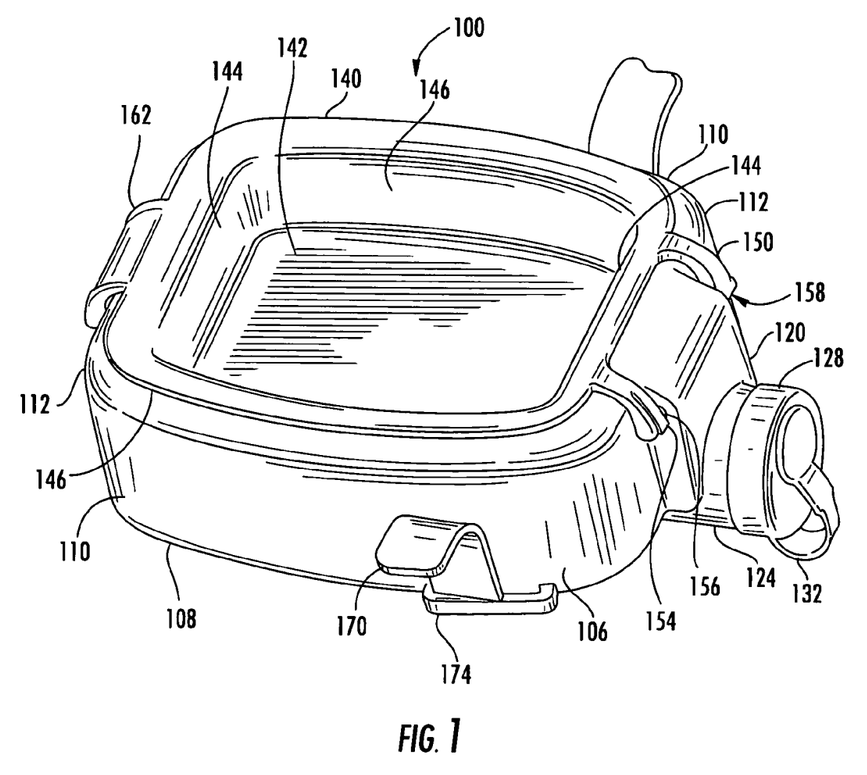
FIG. 1 shows a perspective view of a container and dish in a storage configuration.

FIG. 1 illustrates a container and dish 100. The container and dish 100, and/or components thereof, may be made from any suitable materials, including various types of plastic.

The container and dish 100 includes a substantially rectangular container portion 106. The container portion 106 is hollow and has an outer bottom wall 108, two arcuate outer longitudinal sides 110, and two arcuate outer transverse sides 112. The container portion 106 has a corresponding inner bottom wall (not shown in FIG. 1), two arcuate inner longitudinal sides (not shown in FIG. 1), and two arcuate inner transverse sides (not shown in FIG. 1). Liquid may be stored in a hollow area between each of the inner and outer walls. The container and dish 100 may be other shapes, such as a square, a circle, or an ellipse. In addition, the sides of the container and dish may be straight, rather than curved, or a combination of some straight sides and some curved sides.

A substantially trapezoidal protrusion 120 extends from one of the transverse sides 112. The protrusion 120 may be shaped differently and may be located elsewhere on the container and dish. A cylindrical mouth 124 extends horizontally outward from the protrusion 120. The mouth 124 may be shaped other than cylindrically and/or may extend at an angle, rather than horizontally.

A cap 128 is coupled to the mouth 124. The cap 128 may be coupled to the mouth 124 by any suitable means, such as by mating threads on the cap 128 and mouth 124 or a pressure fit. Alternatively, the cap 128 may be integrally formed with the mouth 124. A tab 132 extends from the cap 128 and removably covers an aperture (not shown in FIG. 1) on the cap 128. If desired, screen or mesh (not shown) may be placed in the cap 128 or mouth 124 to prevent debris or other contaminants from entering the container portion 106 during filling or refilling. The screen or mesh may be made from any suitable material and may be, for example, a plastic or metal mesh.

A dish portion 140 is coupled to the container portion 106. As shown in FIG. 1, the dish portion 140 is substantially rectangular, having a bottom 142, two transverse sides 144, and two longitudinal sides 146. The transverse 144 and longitudinal 146 sides are slightly arcuate. The dish portion 140, when the container and dish 100 is in a storage configuration (as shown in FIG. 1), rests in a depression of the container portion 106 formed by the inner bottom, inner transverse, and inner longitudinal sides of the container portion 106. The dish portion 140 may be shaped other than rectangularly, and may have straight sides rather than arcuate sides. Shaping and dimensioning the dish portion 140 to fit within a depression formed by the inner, transverse, and longitudinal sides of the container portion 106 has certain advantages, including convenient foldout storage even when the dish portion has a funnel (described below). Having the container portion 106 wider than the dish portion 140 may also help stabilize the container and dish when it is laid on a surface, such as the ground, allowing the container and dish 100 to be used without being held for an animal. Alternatively, however, the dish portion 140 is shaped and dimensioned to fit outside of the container portion 106, which may or may not have a depression such as described above.

Arcuate mounting arms 150 extend from one transverse side 144 of the dish portion 140, opposite either side of the protrusion 120. Each mounting arm 150 has horizontally inwardly extending pins, or posts, 154 that are received by corresponding apertures or depressions 156 in the protrusion 120. The pins 154 and depressions 156 form hinges 158, allowing the dish portion 140 to rotate about an axis along a transverse side of the container portion 106. Other mounting and movement joints may be used rather than hinge joints, or a hinge joint may be used that is constructed differently than that shown in FIG. 1.

A curved flange 162 extends outwardly from the transverse side 144 of the dish portion 140 opposite the protrusion 120. The flange 162 may provide a pressure fit to the transverse side 112 of the container portion 106. Other means of selectively securing the dish portion 140 to the container portion 106 may be used.

A strap 170 made of nylon or other material may be threaded through tabs 174 extending from the portion of each longitudinal side 110 of the container portion relatively proximate the mouth 124. Alternatively, the tabs are placed in other locations, the strap is secured by means other than tabs, or another carrying device, such as a handle, is provided.

Figure 2:
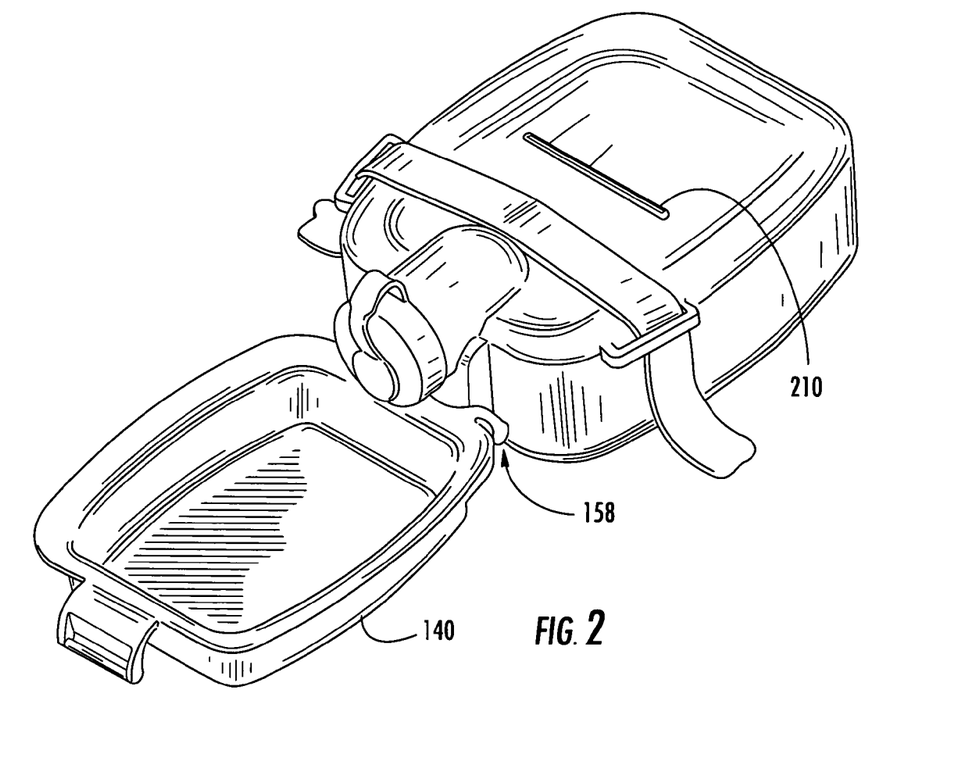
FIG. 2 shows a perspective view of the bottom of the container and dish of FIG. 1 in a dispensing configuration.

FIG. 1 shows the container and dish 100 in its storage configuration, where it may be compactly and easily transported. FIG. 2 shows the container and dish 100 with the dish portion 140 rotated about hinges 158 such that the container and dish 100 is in a dispensing configuration.

A fill line 210 may be marked on the bottom 108 of the container portion 106 so that a user knows how full to fill the liquid container 106 with liquid, or whether the container 106 needs filling. In particular, a user may desire to freeze the container and dish 100 in order to provide cold liquid. The fill line 210 may be located so as to advise a user how full the container and dish 100 may be filled without the expanded frozen liquid damaging the container and dish 100 or blowing off the cap 128.

The container and dish 100 may be used as follows. The liquid container 106 is filled with liquid through the mouth 124, preferably while in the storage configuration of FIG. 1. When liquid is to be dispensed, the dish portion 140 is rotated about the hinges 158 into the dispensing configuration of FIG. 2. The tab 132 may be removed from the aperture in the cap 128 and liquid poured into the dish portion 140.

Before the container and dish 100 is returned to the storage configuration of FIG. 1, unused liquid may be poured through the mouth 124 back into the container portion 106. In an alternative configuration, the portion of the transverse side 144 of the dish portion 140 which will be proximate the mouth 124 when the container and dish 100 is in the dispensing configuration of FIG. 2 is curved to provide a more secure fit between the mouth 124 or container 106 and the dish portion 140. Leakage or spillage of liquid may thus be potentially reduced. In a further implementation, a gasket may be coupled to the curved portion of the dish portion 140 to further reduce liquid loss.

Figure 3:
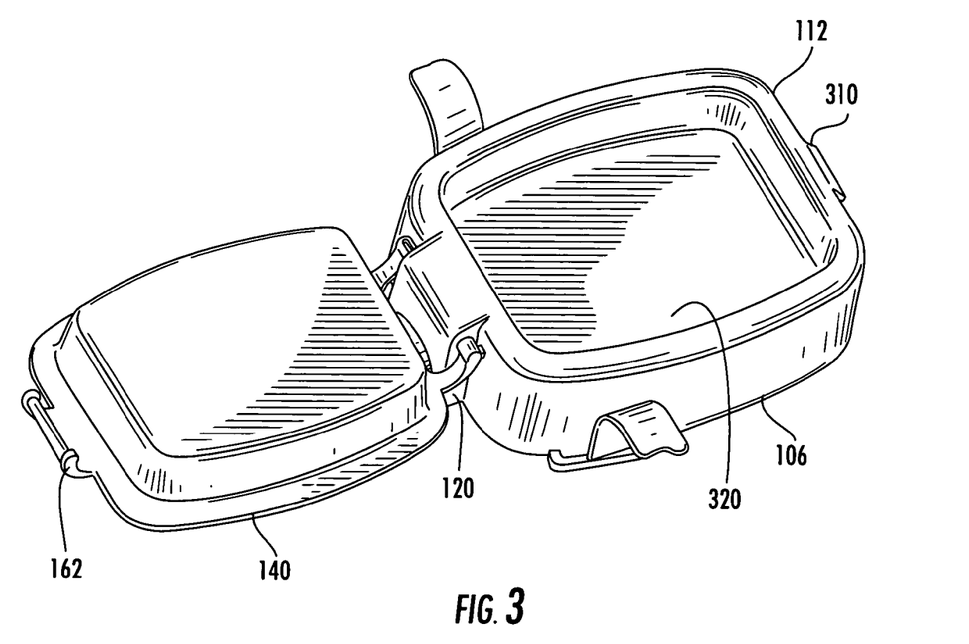
FIG. 3 shows a perspective view of the top of the container and dish of FIG. 1 in a dispensing configuration.

FIG. 3 illustrates an alternative view of the container and dish 100 in a dispensing configuration. The transverse side 112 of the container portion 106 opposite the protrusion 120 has a downward-angled outwardly extending substantially rectangular tab 310. The flange 162 of the dish portion 140 may be secured to the tab 310 when the container and dish 100 is in the storage configuration of FIG. 1. If desired, food or other material may be placed in the area 320 of the container portion 106, which is the depression in which the dish portion 140 is received when the liquid dish and container 100 is in a storage configuration.

If both the area 320 and the dish portion 140 are to be used to simultaneously dispense material, such as food and water, the dish portion 140 may be completely removed from the container portion 106. For example, the mounting arms 150 are preferably sufficiently flexible to allow the pins 154 to be removed from the depressions 156. When the liquid dish and container 100 is desired to be placed in a storage configuration, the pins 154 can be reinserted into the depressions 156 and the dish 140 secured to the container portion 106 by the flange 162 and the tab 310.

Figure 4:
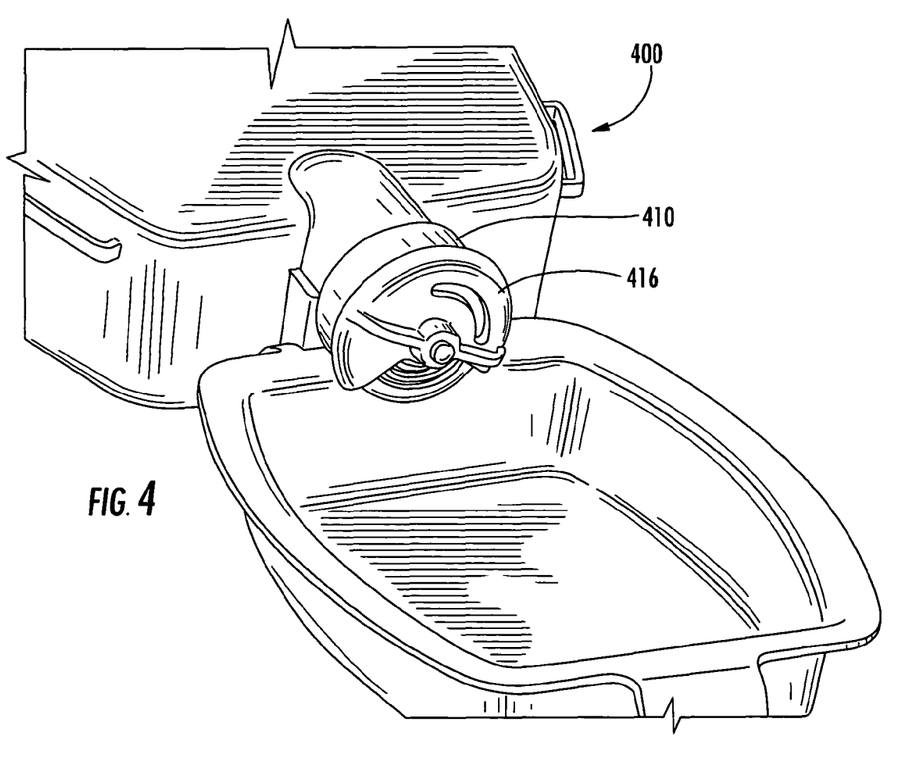
FIG. 4 shows a perspective view of a container and dish having a rotatable lid.

FIG. 4 illustrates an alternative implementation of a container and dish 400. The container and dish 400 may be similar to the container and dish 100, or they may have a different design. However, the container and dish 400 has a cap 410 with a rotatable lid 416.

Figure 5:
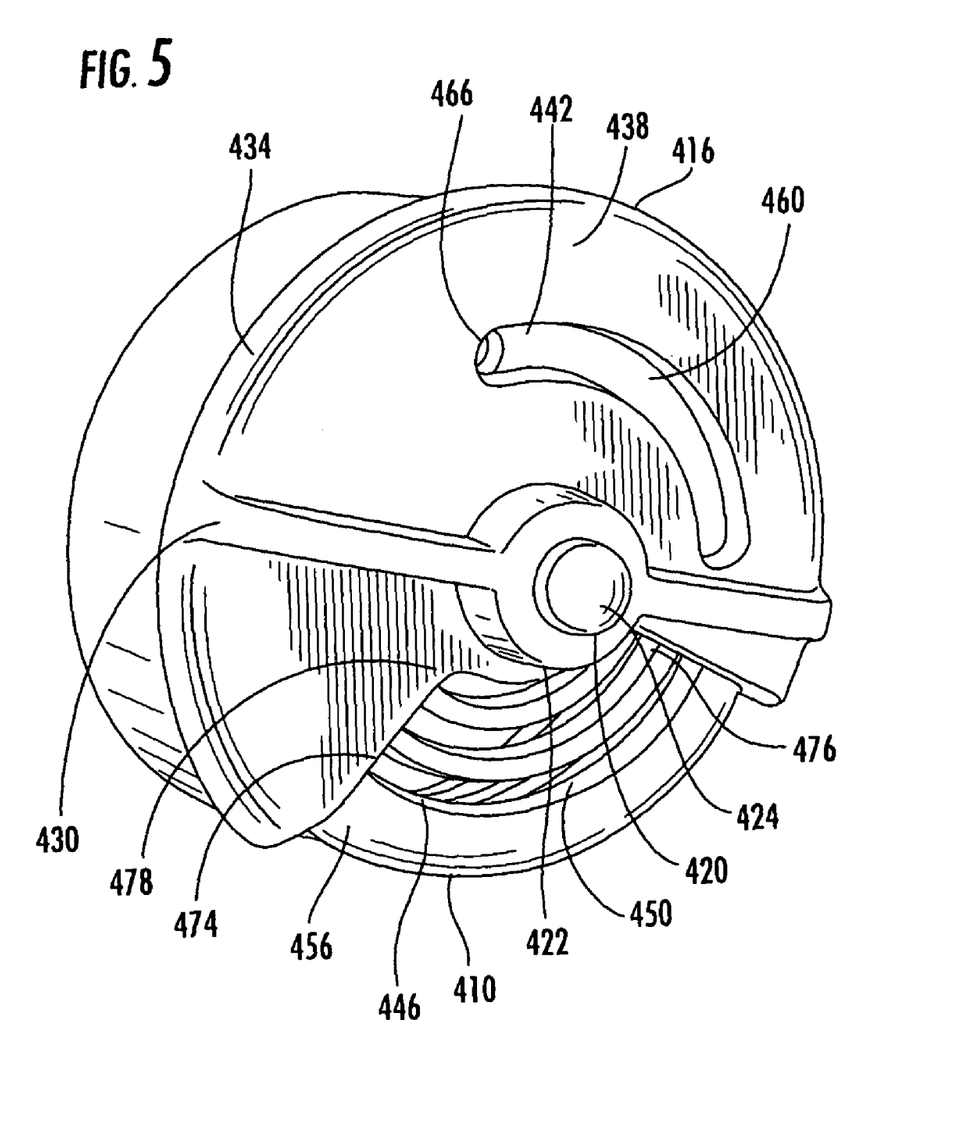
FIG. 5 shows a detailed perspective view of the rotatable lid of the container and dish of FIG. 4.

FIG. 5 further illustrates the cap 410 and lid 416 of the container and dish 400 of FIG. 4. The lid 416 may be secured to the cap 410 by placing a circular aperture 420 formed in a raised cylindrical flange 422 at the center of the lid 416 over a cylindrical protrusion 424 extending outwardly from the center of the cap 410. In certain embodiments, the aperture 420 and protrusion 424 are held together by a pressure or friction fit. In other embodiments, a securing mechanism, such as a gasket or o-ring may be placed on a portion of the protrusion 424 extending through the aperture 420. Other means may be used for securing the lid 416 to the cap 410.

A raised rectangular protrusion 430 extends along the diameter of the lid 416, intersecting the cylindrical flange portion 422 and may be used as a gripping surface to turn the lid 416 relative to the cap 410. The lid 416 has a portion 434 with no apertures formed therein, a portion 438 with a single curved slot 442 formed therein, and a portion 446 with a wedge shaped cutout 450.

The outer surface 456 of the cap 410 has a portion 460 with no apertures formed therein, a portion with a single curved aperture 466, and a portion with three concentric curved apertures 474, 476, 478. The size, shape, and arrangement of apertures in the lid 416 and cap 410 may be varied as desired so that certain alignments of the cap 410 and the lid 416 allow liquid flow and other alignments of the cap 410 and the lid 416 hinder or prevent liquid flow.

Liquid may selectively be dispensed from the container and dish 400 by turning the lid 416 to a desired position relative to the cap 410. When the portion 434 of the lid is aligned with a certain portion of the cap 410, liquid will be prevented from leaving the liquid container. When the portion 438 of the lid 416 is aligned with the aperture 466 of portion of the cap 410, a comparatively small flow of liquid may be dispensed from the liquid container. When the portion 446 of the lid 416 is aligned with slots 474, 476, 478 of the cap 410, a comparatively large flow of water may be dispensed from the liquid container 400.

Figure 6:
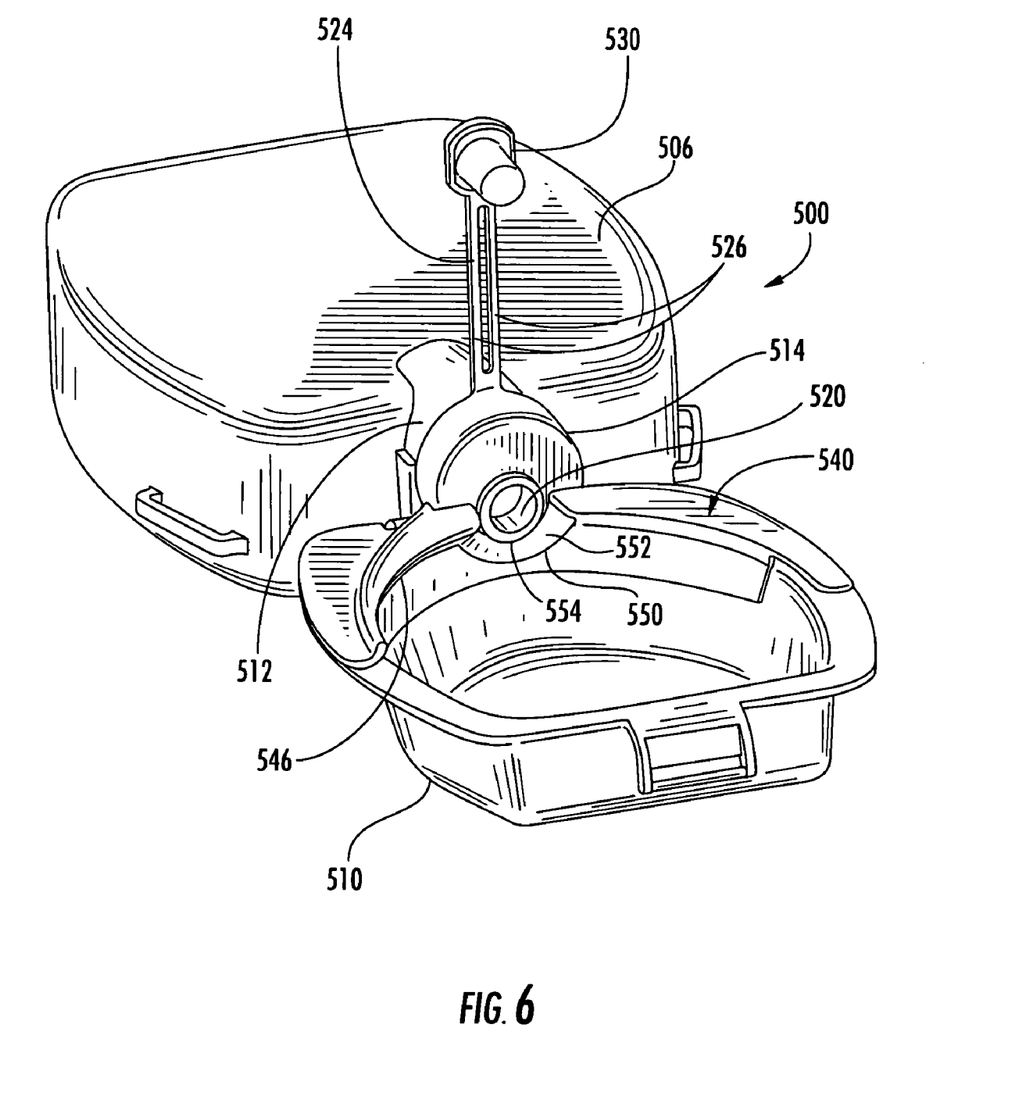
FIG. 6 shows a perspective view of an alternative container and dish of the present disclosure.

FIG. 6 illustrates an alternative embodiment 500 of a container and dish according to the present disclosure. In many respects, the container and dish 500 is similar to the liquid dish and container 100 of FIG. 1. The container and dish 500 has a container portion 506 and a dish portion 510.

The container portion 506 includes a mouth 512 that may be covered by a cap 514. The cap 514 may be removably or permanently affixed to the mouth 512. In particular examples, the cap 514 is threaded (not shown), and threads of the cap 514 are received by mating threads (not shown) formed on the mouth 512. In a more particular example, the cap 514 includes a rotation stop (not shown), such as a protrusion extending into a thread channel of the cap 514. The rotation stop may be used to help protect against over-tightening or stripping of the threads of the mouth 512 or the cap 514. In addition, the rotation stop can be used to adjust the timing of the threads to help ensure that the opening 520 is properly aligned to facilitate transferring liquid from the container portion 506 to the dish portion 510, particularly when the opening 520 is not centered in the cap 514.

The cap 514 is provided with an opening 520 to allow liquid to pass between the container portion 506 and the dish portion 510. A tab, or leash, 524 may be attached to the cap 514, or another structure on the container and dish 500. As shown, the tab 524 is formed from two elongated strips of material 526, such as plastic or rubber. The tab 524 is provided with a plug 530 that extends into the opening 520. The plug 530 is a cylindrical protrusion attached to an obround piece of material, such as plastic or rubber, attached to the elongated strips 526. The opening 520, tab 524 and plug 530 may have different shapes. In alternate embodiments, a valve or nipple, such as a nipple that can be pulled into an open position and pushed into a closed position, may be used in place of the opening 520, tab 524, and plug 530.

In FIG. 6, the dish portion 510 is provided with a funnel structure 540 to aid in transferring liquid between the container portion 506 and the dish portion 510 in a refilling configuration, which in many cases is the same as the dispensing configuration. The funnel structure 540 may be coupled to, or be an integral part of, the container portion 506 or dish portion 510. The funnel structure 540 may be removable or permanently affixed to the container and dish 500.

In the particular embodiment of FIG. 6, the funnel structure 540 is a lip, or tray, 546 extending from the longitudinal sides of the dish portion 510 to a transverse side of the dish 510 proximate a well 550 for receiving the mouth 512 of the container portion 506. The lip 546 may be coupled to the dish portion 510 or may be an integral part of the dish portion 510. The lip 546 curves convexly away from the bottom of the dish portion 510 and towards the interior of the dish portion 510, so as to form a funnel leading into the mouth 512. This helps speed up refilling while reducing spillage from splattering. The lip 546 is tapered, such that it becomes progressively wider towards the mouth 512. Alternatively, the funnel structure has another shape or configuration, for example, being formed in part on the dish portion 510 and in part on the container portion 506 or mouth 512 thereof, or being a separate piece from, but capable of being placed in fluid communication with the dish portion 510 and the container portion 506, or covering more (or less) of the dish portion 510 with the lip 546 or other covering.

In FIG. 6, proximate the middle of the end of the dish portion 510 and proximate the mouth 512 of the container portion 506 when the container and dish 500 is in a dispensing configuration, the lip 546 forms a semicircular well 550 for receiving the mouth 512. The portion of the lip 546 forming the upper portion of the well 550 is notched so as to as to allow the mouth 512 to abut the inner wall 552 of the well 550. In particular implementations, the mouth 512 protrudes outward at the opening 520 and the protrusion extends into a well opening 554 defined by the inner wall 552. The protrusion may extend into the dish portion 506, or it may be flush with the inner wall 552 of the well 550. Alternatively, the well structure has another shape or configuration, for example, the well structure may lack a shelf in the well 550 and/or have a differently shaped well opening.

Figure 7:
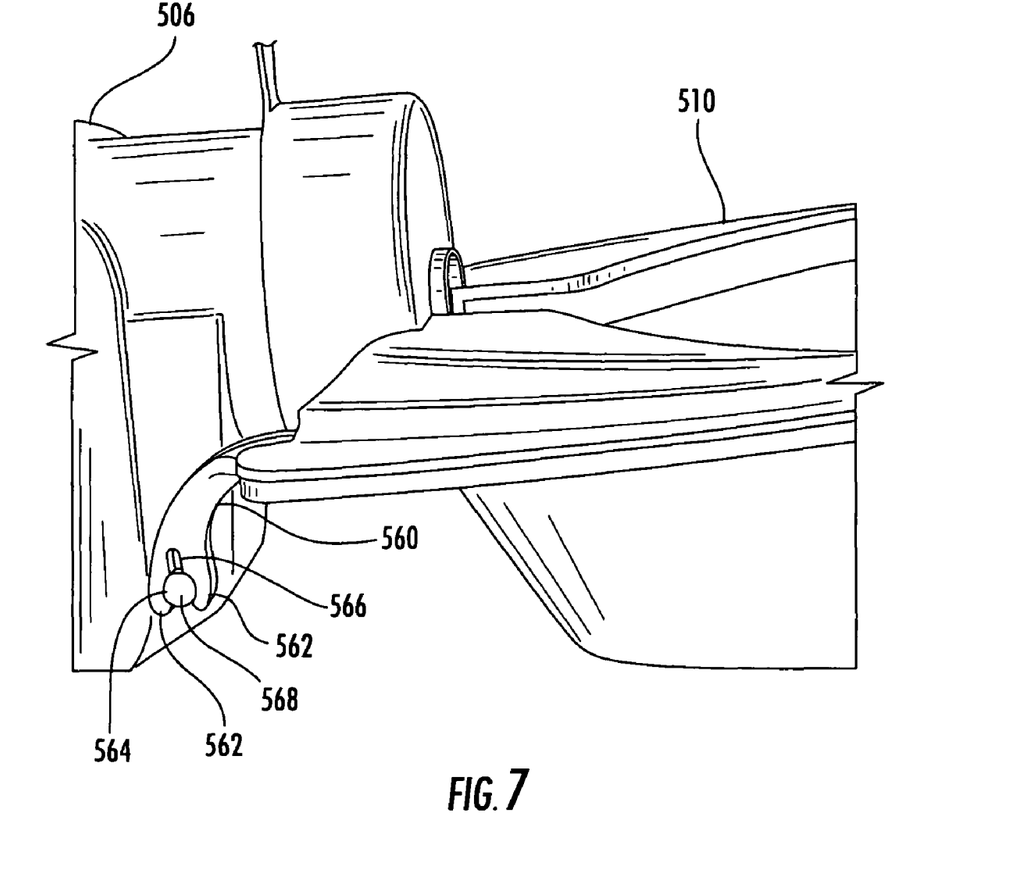
FIG. 7 is a close up perspective view of the container and dish of FIG. 6, illustrating a hinge mechanism that may be used to couple a container portion to a dish portion.

FIG. 7 illustrates an alternative method of attaching a dish to a liquid container. A pair of curved mounting arms 560 (one of which is shown in FIG. 7) extend outwardly from the dish portion 510. The mounting arms 560 each end in two curved prongs 562 that form a generally circular opening 564. A slot 566 extends from the generally circular opening 564 into the mounting arm 560. The two prongs 562 are configured to receive a cylindrical pin 568. Such a pin 568 extends outwardly from each lateral side of the container portion 506. The slot 566 provides some flexibility to the prongs 562, such that they can flex to allow the dish portion 510 to be more easily removed from, and then reattached to, the container portion 506.

Figure 8:
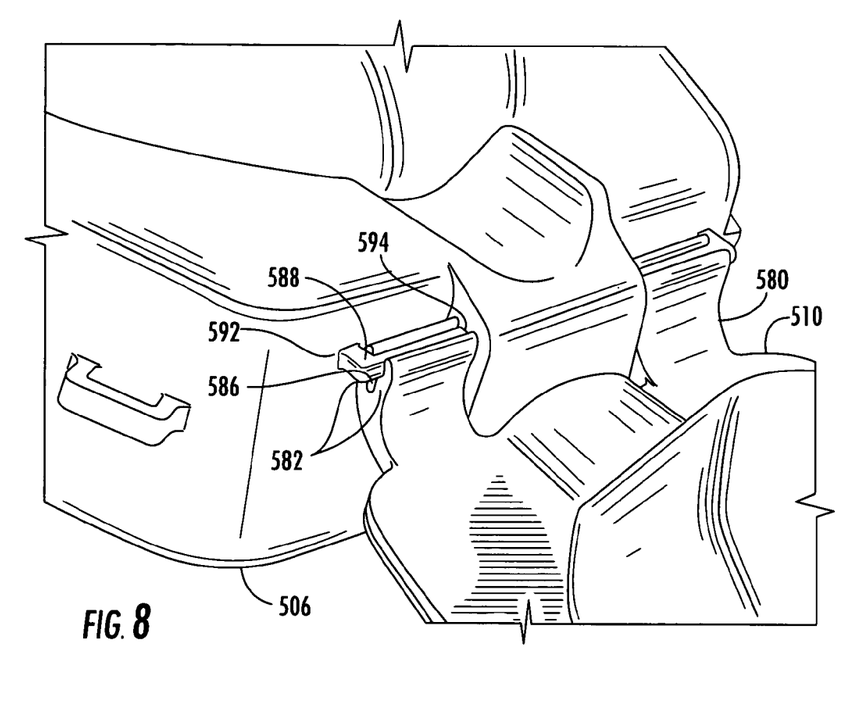
FIG. 8 shows a close up perspective view of an alternate hinge mechanism that may be used with the container and dish of FIG. 6.

FIG. 8 illustrates an alternative hinge mechanism that may be used with the container and dish 500 of FIG. 6. The hinge mechanism includes two curved mounting arms 580. The mounting arms 580 are wider than the mounting arms 560 of FIG. 7. Each of the mounting arms 580 ends in two curved prongs 582 extending the width of the mounting arms 580. The two curved prongs 582 define a generally cylindrical opening that receives an L-shaped cylindrical arm 588 mounted to the dish portion 506 at points 592 and 594. A slot 586 extends from the generally cylindrical opening into each of the mounting arms 580, providing flexibility to the mounting arm 580 so that it can be selectively engaged with, and disengaged from, the arm 588. The width of the mounting arms 580 can be varied and the prongs 582 may be shaped or dimensioned differently than illustrated in FIG. 8. Similarly, the arm 588 may be shaped differently or attached to the liquid container and dish 500 in other ways.

Figure 9:
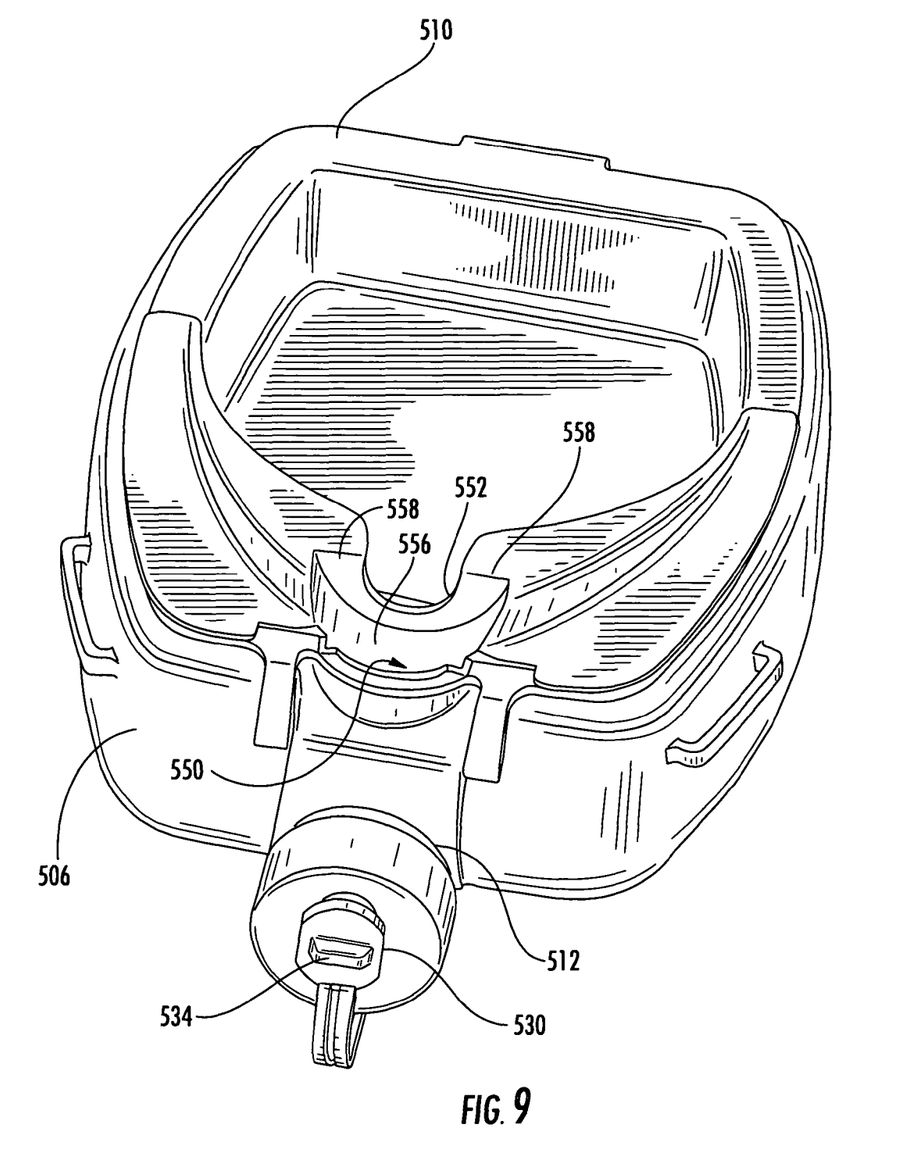
FIG. 9 shows a perspective view of the container and dish of FIG. 6 in a nested configuration.

FIG. 9 shows the container and dish 500 with the container portion 506 and dish portion 510 in a nested configuration, such as when the container and dish 500 is being transported. With the mouth 512 removed from the well 550, it can be seen that the well 550 includes a lower semi-cylindrical shelf 556 that extends outwardly from the inner wall 552 and that the intersection of the inner wall 552 and the shelf 556 form notches 558. The notches 558 help provide a close fit between the mouth 512 and the well 550. As also shown in FIG. 8, in certain embodiments, the outwardly extending end of the plug 530 is provided with a projection 534 to aid a user in grasping, inserting, and removing the plug 530 from the opening 520.

Uses of the Water Supply/Canteen Structures

Water supply/canteen structures such as the ones shown and described above provide, for example, a portable pet water supply or pet canteen. The structures include an attached water dish, as pets cannot drink from the neck of a bottle or canteen. Such a unit may be used for travel with pet owners and their pets. Whether it is a trip to the store or a hike in the woods or a walk in the park, the unit thus allows pet owners to take a water supply with them for use by their pets.

Different water supply/canteen structures have many useful features, for example, for providing easy access to water for a pet, or for saving unused water for later use in a different location. With certain features, unused water can be returned to the container with relative ease.

In some cases, a water container and water dish are attached by a hinge that allows the water dish to fold out of the container in a clamshell fashion. This allows the entire unit to be placed flat or relatively flat on the ground for access by a pet. In such a dispensing configuration, the hinged container can help stabilize the container and dish when it is placed on a surface, such as the ground, for use by an animal. At other times, the dish clips in at the bottom of the container to prevent the dish from opening out of the water container until needed. Nesting the dish inside the container may provide a more compact device.

In some cases, if the water is not consumed by the pet, the unit can be tilted up slightly and the water will flow back into the container from the dish. A funnel structure, such as a lip formed on the dish, may be provided to help allow liquid to be more quickly transferred between the dish and the container and/or to help prevent spillage.

In some cases, a cap on the container contains a grate or screen to help prevent any debris in the dish from entering the container upon pouring the liquid back in. The screen/grate may be molded into the container, or it may be a separate piece (i.e., not molded into the cap) but placed under it in the neck of the liquid container. The cap may also turn to start and stop the flow of water into the dish, thus rendering unnecessary the entire removal of the cap for adding and returning water to/from the dish.

In some cases, the dish can be detached at the hinge to provide both a water dish (the detached dish piece) and a food dish (depression in the liquid container where the dish fits in when folded in place.)

In some cases, the unit has a strap made of nylon or another material for carrying over the shoulder or around the waist.

It is to be understood that the foregoing is a detailed description of certain embodiments. The scope of the present invention is not to be limited thereby and is to be measured by the claims, which shall embrace appropriate equivalents.

We claim:

1. A container and dish comprising:
   a container portion having a plurality of sides, the plurality of sides defining a cavity in the container portion;
   a mouth on one of the plurality of sides of the container portion and in communication with the cavity in the container portion;
   a dish portion having a plurality of sides and a bottom wall that defines an open cavity in the dish portion; and
   a funnel on at least one of the plurality of sides of the dish portion that is in communication with the cavity in the dish portion;
   the container portion and dish portion being hingedly coupled with one another whereby the dish portion may be selectively moved between a storage configuration and a dispensing configuration; the bottom wall of the dish portion and at least one side of the container portion being in a facing, confronting relationship with one another in the storage configuration; the funnel of the dish portion being adjacent and in open fluid communication with the mouth of the container portion in the dispensing configuration;
   wherein the funnel speeds up transfer and/or reduces spillage during refilling of the container portion from the dish portion through the mouth of the container portion.

2. The container and dish of claim 1, wherein the funnel comprises a lip affixed to the dish portion.

3. The container and dish of claim 2, the plurality of sides of the dish portion comprising a plurality of longitudinal sides and a transverse side proximate the mouth, the lip extending from at least a portion of the longitudinal sides to at least a portion of the transverse side of the dish portion.

4. The container and dish of claim 3, wherein the lip is tapered and becomes wider proximate the transverse side of the dish portion.

5. The container and dish of claim 2, wherein the funnel is permanently affixed to the dish portion.

6. The container and dish of claim 1, further comprising a well formed in a transverse side of the dish portion.

7. The container and dish of claim 6, wherein the well defines an aperture in the transverse side of the dish portion.

8. The container and dish of claim 6, wherein the well comprises a shelf configured to abut the mouth of the container portion when the container and dish is in an open, refilling configuration.

9. The container and dish of claim 1, wherein the dish portion is removably coupled to the container portion.

10. The container and dish of claim 9, wherein the dish portion comprises a mounting fork and the container portion defines plural receptacles, wherein the receptacles may releasably receive the mounting fork.

11. The container and dish of claim 9, wherein the dish portion comprises a pair of mounting arms each comprising clamp arms defining an aperture, wherein the container comprises a plurality of mounting pins, and wherein the clamp arms for each of the mounting arms are configured to removably engage a corresponding one of the mounting pins.

12. The container and dish of claim 1, wherein the dish portion is coupled to, movable with respect to, and configured to at least partially fit within a depression in, the container portion.

13. The container and dish of claim 12, wherein, in a closed, storage configuration, one or more of the plurality of sides of the dish portion abut one or more of the plurality of sides of the container portion within the depression, and a lip of the dish portion abuts one or more of the plurality of sides of the container portion above the depression.

14. The container and dish of claim 12, wherein the depression defines a first bowl of a bowl shape and the dish portion defines a second bowl of the bowl shape, the second bowl being smaller than the first bowl.

15. The container and dish of claim 1, wherein the dish portion is coupled to the container portion such that the dish portion and container portion are nested in a closed, storage configuration and at least substantially co-planar in an open configuration.

* * * * *